No. 799,783. PATENTED SEPT. 19, 1905.
C. G. ETTE.
WASHER.
APPLICATION FILED NOV. 21, 1904.

Witnesses
a. J. McCauley
B. F. Funk

Inventor:-
Charles G. Ette.
BY Bakewell Cornwall
ATTY'S.

UNITED STATES PATENT OFFICE.

CHARLES G. ETTE, OF ST. LOUIS, MISSOURI.

WASHER.

No. 799,783.  Specification of Letters Patent.  Patented Sept. 19, 1905.

Application filed November 21, 1904. Serial No. 233,687.

*To all whom it may concern:*

Be it known that I, CHARLES G. ETTE, a citizen of the United States, residing at St. Louis, Missouri, have invented a certain new and useful Improvement in Washers, of which the following is a full, clear, and exact description, such as will enable others skilled in the art to which it appertains to make and use the same, reference being had to the accompanying drawings, forming part of this specification, in which—

Figure 1:
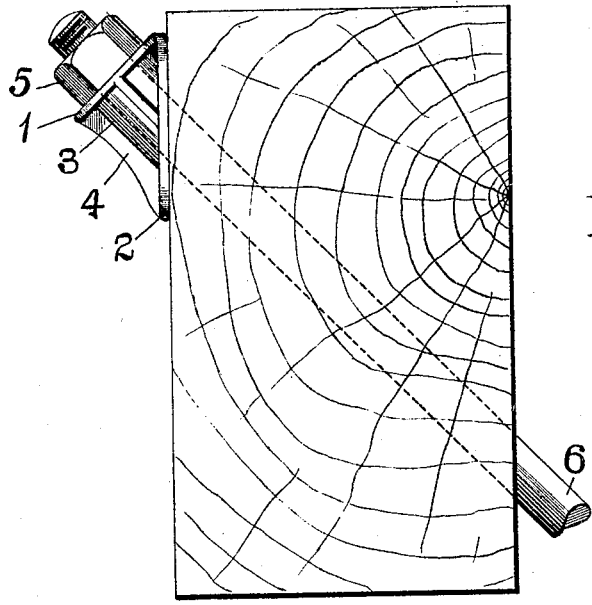
Figure 2:
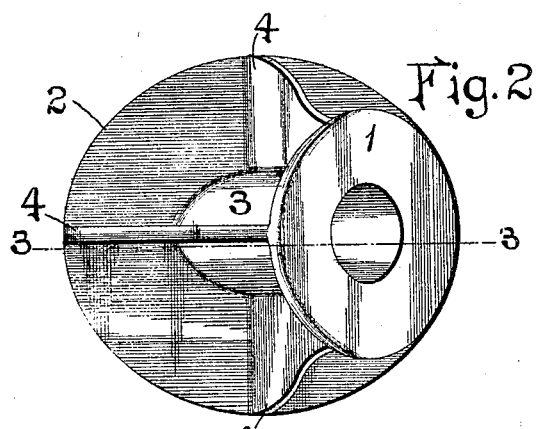
Figure 4:
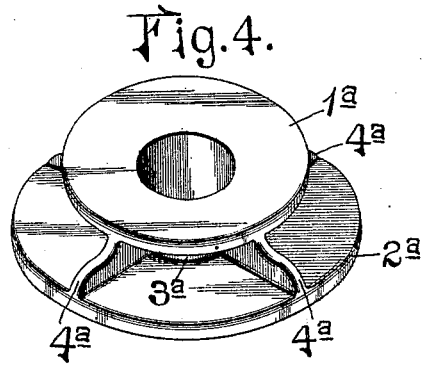
Figure 3:
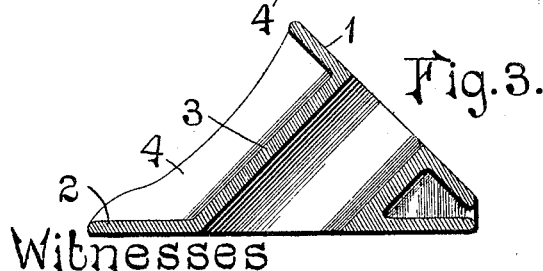

Figure 1 is a side elevational view of an angle-washer constructed in accordance with my invention. Fig. 2 is a perspective view of the angle-washer. Fig. 3 is a sectional view on the line 3 3 of Fig. 2, and Fig. 4 is a perspective view of a slightly-modified form of washer.

This invention relates to washers, and more particularly to washers commonly employed in connection with tie-rods and the like for withstanding heavy strains, such as in car and bridge construction, roof construction, &c.

One object is to provide a washer which can be cheaply manufactured and which is light and strong.

Another object is to construct a washer which will be capable of withstanding the strains to which such washers are subjected and which will require a relatively small amount of metal in their construction.

It is also the object of the invention to construct the washer of a malleable casting.

Heretofore the washers generally used have been made solid in order to withstand the strain placed upon them by the tie-rods, and on account of the various thicknesses throughout the body portion of the washer it was impossible to anneal them. Therefore they were exceedingly brittle and as a result were liable to become injured in transit.

By constructing washers similar to the one to be hereinafter described they are made capable of being annealed so as to possess better wearing qualities, as well as being capable of withstanding greater strains than those washers constructed of ordinary cast-iron.

Another object is that the washers constructed in accordance with the invention described in this application can be made so as to provide a greater number per pound than those heretofore generally employed, thus reducing the cost of shipping, as well as reducing the weight of the washers per given number on the structure upon which they are used.

In the form illustrated in Figs. 1 to 3 I have shown a washer on a forty-five-degree angle, although the angle may be varied to suit the particular work involved. The washer consists of two flanges 1 and 2, connected by a tubular web 3. Radially disposed around the tubular web 3 is a plurality of ribs or connecting-webs 4, which have their outer edges flush with the peripheries of the flanges 1 and 2. The flange 1 is termed a "face-flange" and receives the nut 5 on the end of the tie-rod 6. The flange 2 is a base-flange and is designed to rest against the beam or other support. In casting these washers I prefer to form them with four radial strengthening ribs or webs 4, the longitudinal rib and the one diametrically opposite it being the meeting points for the matrix, it being understood that the mold is made in two parts. The flanges 1 and 2, the tubular connecting-web 3, and the bracing or strengthening webs 4 are all of substantially the same thickness to facilitate an even annealing of the washers throughout.

In Fig. 4 I have shown a slightly-modified form of the washer, in which the flanges $1^a$ and $2^a$ are parallel and are connected by the spacing tubular web $3^a$, said flanges $1^a$ and $2^a$ being additionally connected by the strengthening-webs $4^a$.

Having thus described the invention, what is claimed as new, and desired to be secured by Letters Patent, is—

1. An angle-washer comprising a malleable casting having a face-flange and a base-flange, a tubular spacing-web connecting the base-flange and face-flange, and four strengthening-webs equidistantly arranged around the tubular web and having their ends connected to the face-flange and base-flange; substantially as described.

2. As a new article of manufacture, a malleable washer comprising a flat face-flange, a flat base-flange, a tubular connecting-web of less diameter than the base-flange and face-flange for connecting them, and four connecting-webs radially disposed around the tubular web and connecting the face-flange and base-flange; substantially as described.

3. As a new article of manufacture, a malleable washer comprising a flat base-flange, a flat-faced flange in a plane other than a plane parallel to the plane of the base-flange, a tubular connecting-web of less diameter than the base-flange and face-flange, said web connecting them, and a plurality of radially-connecting webs disposed around the tubular web and having comparatively broad ends which are connected to the inner faces of the base-flange and face-flange; substantially as described.

4. As a new article of manufacture, a malleable washer comprising a casting having a flat base-flange 2, a flat-faced flange 1 at an angle thereto, a tubular web connecting the base-flange and face-flange, said tubular web being of less diameter than the base-flange and face-flange, the base-flange being of greater diameter than the face-flange, and a plurality of radial connecting-webs disposed around the tubular web, said connecting-webs being of the same widths at their respective ends as the distance from the outer face of the tubular connecting-web to the periphery of the particular face-flange adjacent each end of each connecting-web; substantially as described.

In testimony whereof I hereunto affix my signature, in the presence of two witnesses, this 17th day of November, 1904.

CHARLES G. ETTE.

Witnesses:
EDW. SCHMIDDE,
EDW. P. KYLE.